Patented May 17, 1927.

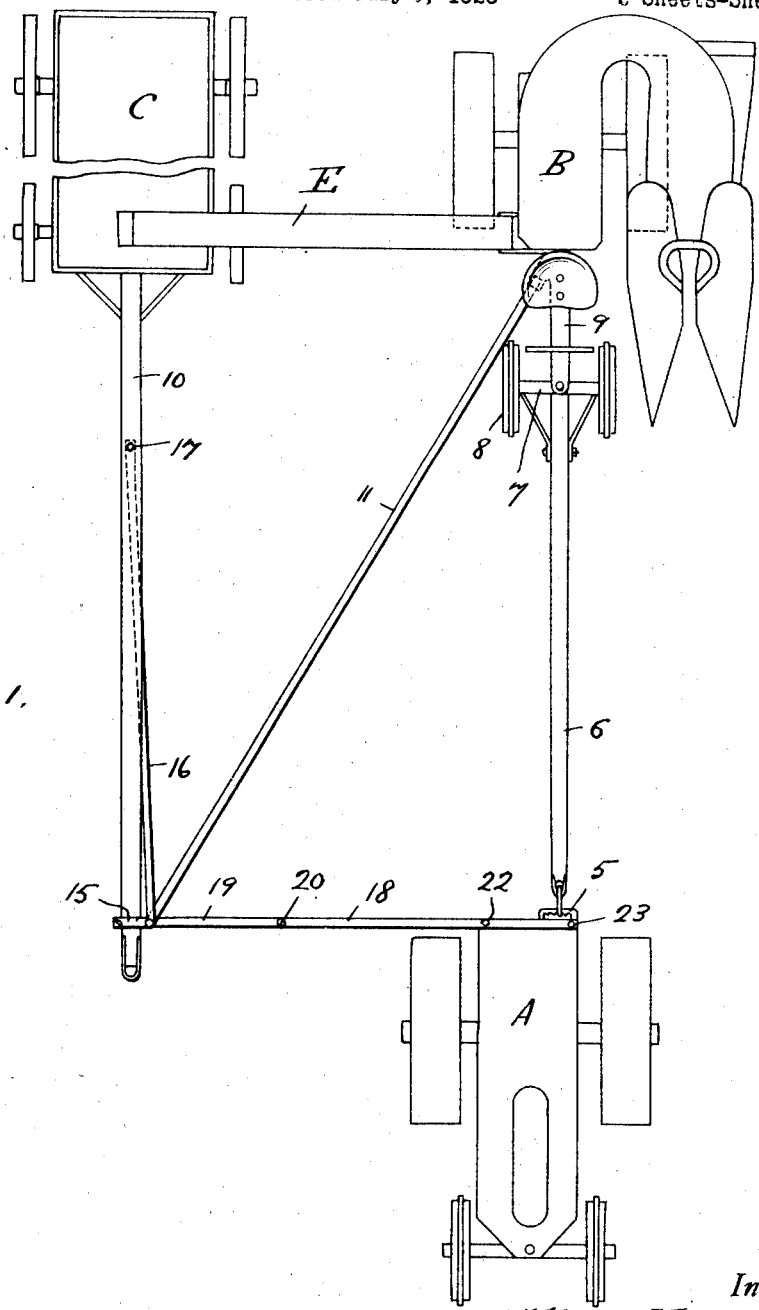

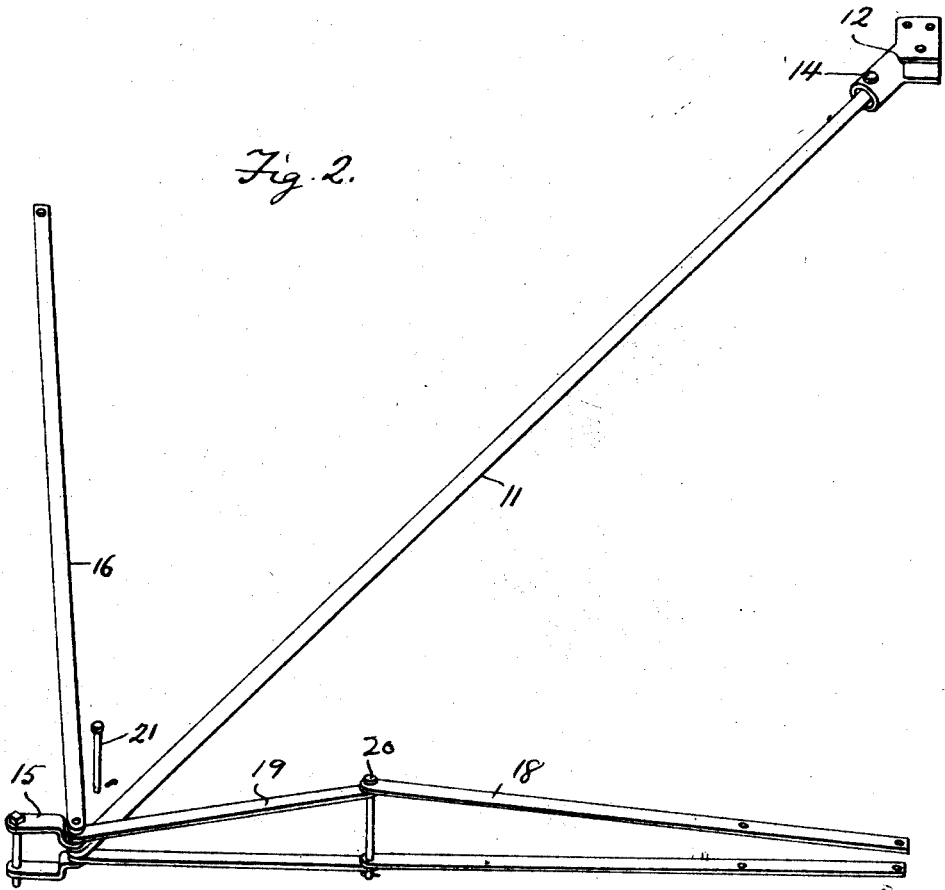

1,628,721

UNITED STATES PATENT OFFICE.

WILLIAM HAGEDORN, OF SUTHERLAND, IOWA.

DRAFT APPLIANCE.

Application filed July 9, 1926. Serial No. 121,389.

The present invention relates to a draft appliance particularly designed for the purpose of drawing a wagon to receive corn delivered from a corn picker, both the wagon and corn picker being pulled by a tractor.

The important object of the invention is to provide an appliance of this nature which is exceedingly simple in its construction, efficient and reliable in operation, simple, durable, inexpensive to manufacture, and not likely to readily become out of order.

Another very important object of the invention lies in the provision of an appliance of this nature which may be easily and quickly assembled and disassembled in respect to the picker, wagon and tractor.

Another important object of the invention is to provide an appliance of this nature which is capable of allowing the tractor to turn a curve and properly steer the wagon and corn picker.

With the above and numerous other objects in view as will appear as the description proceeds, the invention resides in certain novel features of construction, and in the combination and arrangement of parts as will be hereinafter more fully described and claimed.

In the drawing:—

Figure 1 is a top plan view of the appliance, showing the same in combination with a tractor, corn picker, and wagon, Fig. 2 is a perspective view of the appliance.

Referring to the drawing in detail, it will be seen that the letter A denotes a tractor, the letter B a corn picker, and the letter C a wagon. These implements are all of conventional or any preferred construction. The tractor A is provided with a frame member 5, to which the tongue 6 is attached, this tongue being mounted on the bolster 7 having wheels 8 associated therewith in the usual manner. The stub tongue 9 of the corn picker B is engaged with the bolster 7 in the usual manner. The wagon C includes the usual tongue 10.

A push bar 11 is attached to a bracket 12 thru the medium of a pin 14. The bracket 12 is attached to the tongue 9 adjacent the corn picker B. On the forward end of the tongue 10, there is mounted a clamp 15. A rod 16 is attached to an intermediate portion of the tongue 10 as at 17. A guide bar includes sections 18 and 19 pivoted together as at 20. The end of the section 18 is engaged with the member 5. The end of the section 19, the end of the push bar 11, and the forward end of the rod 16 is provided with registering apertures for receiving a pin 21, so as to be pivotally engaged with the clamp 15.

The section 18 is rigidly engaged with the tractor A being secured at two points 22 and 23 in any suitable manner. As the tractor A pulls the corn picker B through the intermediacy of the tongue 6 and stub tongue 9, the bar 11 will be pushed for drawing the wagon C alongside of the corn picker, the bar 11 being prevented from swinging outwardly by the guide rod 18, 19. The pull on the wagon C takes place through the rod 16 and the tongue 10, thereby taking any unnecessary strain off the clamp 15. When the tractor turns, the sections 18 and 19 pivot in relation to each other, thereby properly guiding the wagon C. The wagon C is disposed, as is desirable right alongside of the corn picker B and the elevator E extends from the corn picker over into the wagon.

It is thought that the construction, operation, and advantages of this invention will be readily appreciated by those skilled in this art without a more detailed description thereof. The present embodiment of the invention has been disclosed merely by way of example since in actual practice it attains the features of advantage enumerated as desirable in the statement of the invention and the above description. Numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. A draft appliance of the class described; wherein a tractor is utilized for pulling a corn picker and a wagon for receiving corn therefrom; comprising a bracket attached to the stub tongue of the corn picker, a bar engaged with the bracket and extending forwardly to one side, a guide rod formed in pivotally associated sections, one section being rigidly engaged with the tractor, a rod engaged at one end with an intermediate portion of the tongue of the wagon, a clamp on the tongue of the wagon, means for pivotally engaging the other section of the guide rod, the other end of the push bar, and the forward end of the second mentioned rod with the clamp.

2. A draft appliance; wherein a tractor is adapted to pull a corn picker and a wagon; comprising a push bar, means for attaching one end of the push bar to the stub tongue of the corn picker, the other end of the bar being provided with an aperture, a guide rod formed in sections, means for rigidly attaching one section to the tractor, means for pivoting the sections together, the other section having its end provided with an aperture, a pull rod having one end pivotally engaged with an intermediate portion of the tongue of the wagon and the other end provided with an aperture, a clamp engaged with the forward end of the tongue and provided with an aperture, all of said apertures being in registration, and a pin piercing said apertures.

In testimony whereof I affix my signature.

WILLIAM HAGEDORN.